July 27, 1926.
E. A. WATTS
VALVE CONSTRUCTION
Filed Oct. 29, 1924
1,594,285
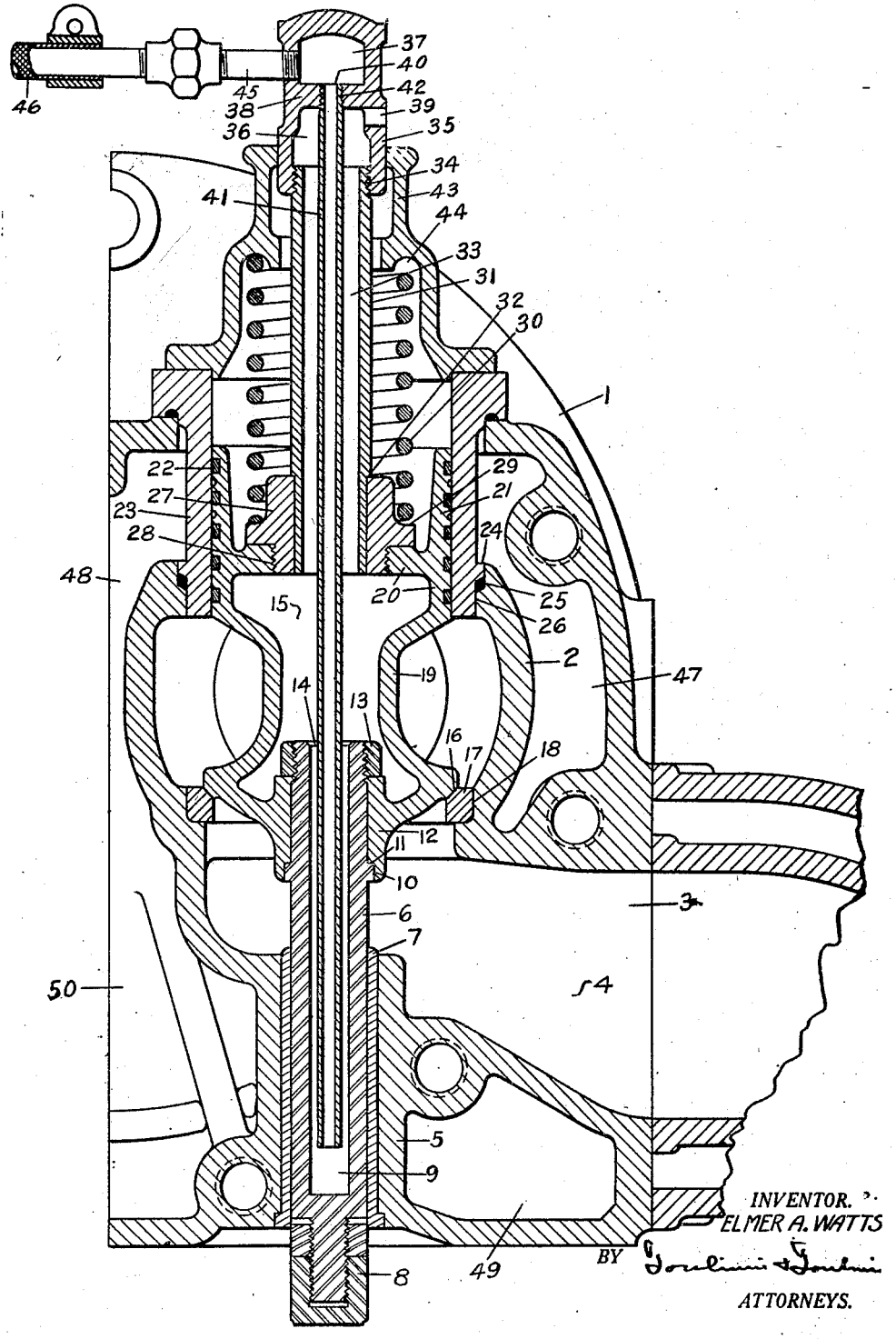
INVENTOR.
ELMER A. WATTS
BY
ATTORNEYS.

Patented July 27, 1926.

UNITED STATES PATENT OFFICE.

ELMER A. WATTS, OF SPRINGFIELD, OHIO, ASSIGNOR TO THE MILLER IMPROVED GAS ENGINE COMPANY, OF SPRINGFIELD, OHIO, A CORPORATION OF OHIO.

VALVE CONSTRUCTION.

Application filed October 29, 1924. Serial No. 746,480.

My invention relates to valve construction in an internal combustion engine and in particular to the cooling thereof.

It is the object of my invention to provide a valve which is cooled internally and externally.

It is a further object to provide a valve in which the valve stem is subjected to the minimum of heating from the outgoing gases.

It is an additional object of my invention to provide a valve which can be readily replaced without necessity for special adjustment of the valve casing.

It is a further object to provide a valve mechanism in which the entire mechanism may be removed without disturbing the valve casing or the cooling chambers around it.

It is an additional object of my invention to provide the application of cooling fluids to the interior of the valve at a point where the cool fluids will be caused to rise by the heating of the fluids coming in contact with the heated valve so that the water will be assisted in the circulation through the valve due to the heating thereof.

It is a further object to provide such cooling fluids for the interior of the valve irrespective of the position of the valve in its operation.

Referring to the drawing, I have illustrated a section through the valve housing, valve casing, exit chamber, a valve structure and the cooling apparatus therefor.

Referring to the drawings in detail, 1 is a main casing in which is located the exhaust valve casing 2, which is a cylindrical structure having an open top and an open bottom, the top being filled by the valve supporting structure and the bottom being closed by the valve itself. The bottom of this valve casing 2 extends into a passageway 3 for the exhaust gases formed by the walls 4. These walls 4 shut the outer wall of the casing 1 and is also supported by a column 5 which acts as a guide for the valve stem 6. A bushing 7 is provided in this column 5 in engagement with the stem 6. The bottom of the valve stem 6 is provided with a valve tappet 8. The interior of the valve stem is hollow as at 9. On the upper end of the stem is a shoulder 10 fitting on a corresponding shoulder 11 which supports the valve body which has a throat portion 12 for embracing the upper end of the valve stem and engaged between the shoulder 10 and the nut 13 which is threaded on the upper end of the valve stem 6. The interior of the valve stem 6 is open at the top as at 14 and communicates with the interior chamber 15 of the valve itself. The valve is provided with a valve seat engaging portion 16 resting upon a valve seat 17 which is carried in a recessed shoulder 18 of the cylindrical exhaust valve casing 2. The valve is restricted into a relatively narrow throat 19 which is extended at its upper end into an enlarged head 20 having a skirt 21 carrying packing rings 22 which engage with the wall of the cylinder 23. This cylinder rests through its shoulder 24 upon a packing ring 25 carried on a shoulder 26 of the casing 2. This cylinder rests on the margin of the upper open end of the casing 2. The valve with its piston-like head 20 and skirt 21 fits within this opening within the member 23. The valve itself in its head 20 carries a screw plug 27 which is threaded as at 28 in an aperture in the head 20 of the valve. This screw plug is provided with a shoulder 29 for receiving a valve spring 30. This screw plug is also hollow and is provided with a hollow sleeve 31 which is mounted on the plug by a shoulder 32. This sleeve has an interior cylindrical passageway 33. The upper end of the sleeve is threaded as at 34 for receiving a cap 35 which is provided with a lower chamber 36 and an upper chamber 37 separated by a dividing wall 38. The lower chamber 36 is provided with an exhaust passageway for the exhaust cooling fluid designated 39. The partition 38 has an aperture 40 and carries a pipe 41 which is threaded at 42 in such aperture. This cap fits within a cup shaped cap member 43 which has a seat 44 for the upper end of the spring 30. The upper chamber 37 is provided with an inlet pipe 45 which in turn is connected to a flexible hose 46.

The valve structure, valve casing and exhaust passageway as well as the guide for the valve stem is completely surrounded by cooling fluid in the chambers 47, 48, 49 and 50. In operation the cold water is supplied through the pipes 45, 46, chamber 37, through the pipe 41 to the bottom of the valve stem 6 whence it makes its exit under pressure and rises as it is heated through the valve stem cooling it into the chamber 15 cooling the valve and up the passageway 33 into the chamber 36 and out the exhaust passageway 39.

It will be apparent that the interior of the valve as well as the exterior of the valve casing is thoroughly cooled while it is possible to lift the entire valve assembly and cooling mechanism together with the valve stem bodily upwardly out of the valve housing and the main casing, thus permitting access to the valve and to the valve seat for adjustments. It is also possible to clean out, by separating the several parts through unscrewing them, the interior of the valve structure.

It will be understood that I desire to comprehend within my invention such modifications as may be necessary to adapt it to varying conditions and uses.

Having thus fully described my invention, what I claim as new and desire to secure by Letters Patent, is:—

1. In an internal combustion engine, a valve construction consisting of a main casing, a valve casing located therein but spaced therefrom with cooling passageways therebetween, a hollow valve mounted in said casing having a hollow valve stem, and an exhaust pipe carried by said valve body, said valve casing having an open upper end coinciding with an aperture in the main casing, a sleeve fitting in said openings to form a cylinder, a piston head on said valve working in said cylinder, a cap member on said cylinder, and a valve spring between said piston and cap, means to convey fluid to the bottom of said valve stem to permit it to rise through the stem, valve body and out of the valve body, whereby as the valve moves it will be constantly cooled on the interior and the valve casing will be cooled on the exterior.

2. In an internal combustion engine valve, a valve casing provided with a valve seat, a water jacket surrounding the casing, a valve body in the casing, a hollow valve stem depending from the body, a pipe disposed concentrically in the valve stem and spaced therefrom and adapted to convey liquid into the interior of the valve body and discharge it therein at the bottom thereof and a stem, a pipe carried by the valve body adapted to convey liquid upwardly away from the latter, whereby to insure a positive thermodynamic circulation of the cooling medium throughout the entire interior of said valve, a piston head on the upper end of the valve body, a cylinder supported on the casing and in which the piston operates, a cap resting on the upper end of the cylinder and an expansible spring interposed between the cap and piston, and a second cap partly extending into said first mentioned cap, said second cap also having a dividing wall and an inlet and outlet passage.

3. An internal combustion engine valve comprising a valve casing provided with a seat, a cylinder supported on the upper end of the casing, a hollow valve reciprocable in the casing, a piston head carried thereby and operating in the cylinder, means for circulating a cooling agent evenly throughout the entire length of the valve including a hollow element concentric with said hollow valve and discharging therein near the lower end thereof, a cap resting upon the cylinder, and an expansible coil spring interposed between the cap and piston, and a second cap movable with the valve and partly extending into said first mentioned cap, said second cap also having a dividing wall and an inlet and outlet passage.

4. A liquid cooled valve comprising a casing provided with a valve seat, a hollow valve element in the casing for cooperation with the seat, a liquid discharge tube carried by the valve and having communication with the interior thereof, a cap carried by the discharge tube and having intake and exhaust compartments therein, the former being adapted to be arranged in communication with a source of liquid and the latter having an outlet port therein, and a supply pipe leading from the intake compartment to the valve and extending through the discharge tube.

5. A liquid cooling valve for engines comprising a casing having a valve seat, a hollow reciprocable valve in the casing, a cylinder detachably carried by the casing, a piston head carried by the valve and operating in the cylinder, a discharge tube carried by a piston head, a hollow cap associated with the upper end of the discharge tube and formed with liquid intake and exhaust compartments, the latter communicating with the discharge tube, and a liquid supply tube leading from the intake compartment and adapted to supply liquid to the interior of the valve.

In testimony whereof, I affix my signature.

ELMER A. WATTS.